United States Patent [19]

Eberhardt

[11] Patent Number: 5,378,880
[45] Date of Patent: Jan. 3, 1995

[54] HOUSING STRUCTURE FOR AN ACCESS CONTROL RFID READER

[75] Inventor: Noel H. Eberhardt, Cupertino, Calif.

[73] Assignee: Indala Corporation, San Jose, Calif.

[21] Appl. No.: 109,931

[22] Filed: Aug. 20, 1993

[51] Int. Cl.⁶ .............................................. G06K 7/00
[52] U.S. Cl. .................................................. 235/439
[58] Field of Search ............... 235/382, 435, 439, 441, 235/449, 451, 482, 483; 361/179, 180; 340/551

[56] References Cited

U.S. PATENT DOCUMENTS 5,099,227  3/1992  Geiszler et al. ................. 235/440 X

FOREIGN PATENT DOCUMENTS 3539252  5/1987  Germany .......................... 361/179

*Primary Examiner*—Davis L. Willis
*Assistant Examiner*—Edward Sikorski
*Attorney, Agent, or Firm*—Spencer, Frank & Schneider

[57] ABSTRACT

A radio frequency proximity reader has a base plate housing portion that has an essentially rectangular shape with first and second opposed major surfaces and a centrally located bore. A cylindrical housing portion having a concentrically placed bore is attached to the base plate and extends substantially perpendicular to the first major surface, with the bores of the housing portions being substantially aligned. A radio frequency antenna including a cylindrical ferrite core having at least one concentrically wound coil is concentrically located within the cylindrical housing portion. A light emitting diode and a piezo buzzer are provided within the cylindrical housing portion adjacent the second major surface of the base plate. A cable electronically connects the reader to remotely located signal processing circuits. The base plate may be attached to a wall, whereby the first surface abuts the wall. A rectangular cover attached to the base plate covers the second major surface of the base plate.

6 Claims, 4 Drawing Sheets

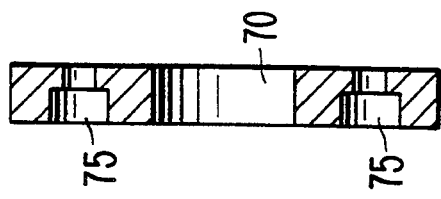
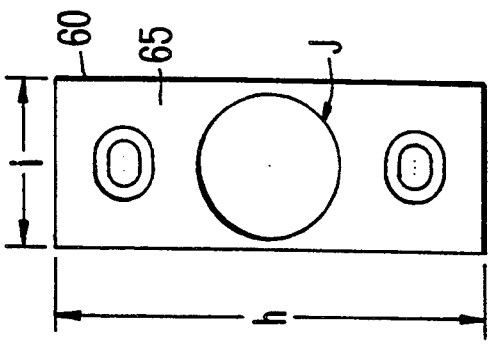
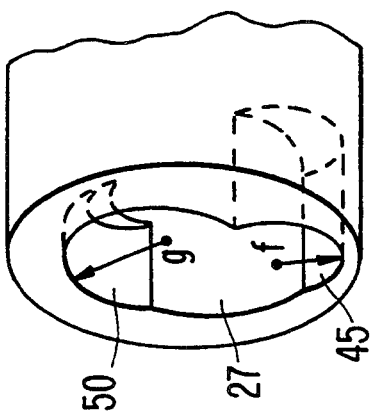

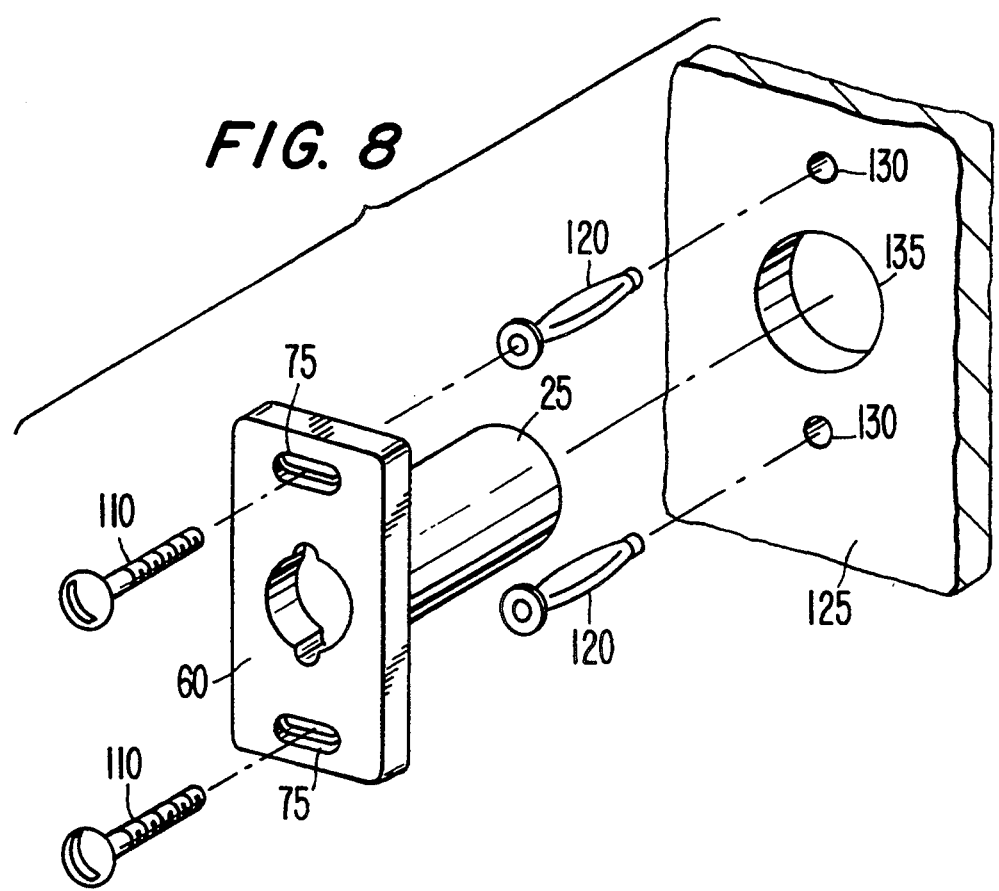
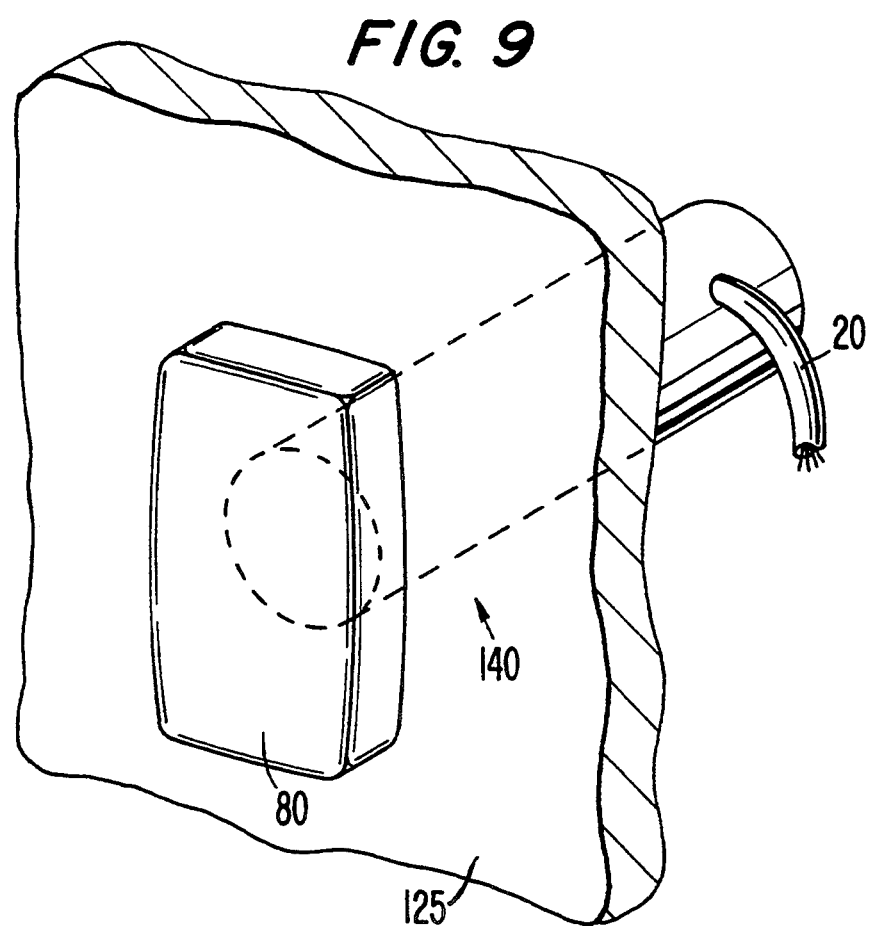

HOUSING STRUCTURE FOR AN ACCESS CONTROL RFID READER

BACKGROUND OF THE INVENTION

The present invention relates to an improved radio frequency identification (RFID) proximity reader antenna used for reading preprogrammed security access cards.

Security access cards are often used as keys to gain entry into or out of buildings, parking garages or the like. Security access cards and readers offer greater security over traditional tumbler locks because the card code cannot be readily copied. Thus, unauthorized use using copied cards is greatly reduced. Furthermore, because the card reader is attached to a host computer, the code on the security access card can be saved in the computer's memory, keeping tally of when each user entered or exited through the secured door or gate.

Traditionally, security access cards were inserted or swiped through a card reader. The card reader would then "read" the code on the card, transmit the code signal to a host computer, and subsequently unlock or open the associated door or gate. However, insert type card readers, as well as the traditional key and tumbler lock systems have several disadvantages. Firstly, the insert and swipe type cards must be inserted into or swiped along the reader. Thus, a user must stop, find their card, remove it from their person or belongings, and then insert it or swipe it through the reader. This process is more time consuming, both for the user inserting the card, as well as subsequent users waiting to insert their own cards. Second, the slot for inserting the security access card on the card reader can be vandalized with liquids, grease, chewing gum, etc., thus preventing the card reader from being used. Third, insert card readers can misread the security access card if the insert card is put into the reader upside down or backwards. Swipe type access cards must be swiped with a precise motion to make sure the entire coded portion of the card is passed by the reader head. If the swipe type card is picked up or lifted too soon, a misread of the code may occur.

Solutions to the above problems have been developed with the advent of radio frequency identification proximity sensor cards and access control readers, i.e. readers. RFID proximity cards allow a user to simply pass the security access card in front of the reader from a distance of a few inches up to several feet away. Because there are no slots to insert the card into, vandalism of the card reader is diminished. Furthermore, misreads of the access card are eliminated, regardless of how the card is presented to the reader. Known proximity readers contain, for example, a magnetic coil which energizes an associated proximity access card. The proximity access card contains a microchip precoded with data. The energy from the reader activates the microchip, which in turn magnetically, electrically or electromagnetically sends the precoded data back to the reader and attached host computer for verification. If the code is verified, the door or gate is subsequently unlocked or opened. An LED signal and/or audio tone may be activated to let the user know the code was verified.

Due to technological constraints, known proximity readers have been constrained to relatively large housings, making them more aesthetically objectionable. Of course, placement of the proximity reader is also limited to areas capable of accommodating the housing.

SUMMARY OF THE OBJECTION

It is an object of the present invention to avoid the aforementioned drawbacks by providing a RFID proximity reader that is reduced in size, while retaining relatively long range sensor capabilities.

It is a further object of the present invention to provide a reader having a housing which is the shape and size of a domino for a smaller, more aesthetically pleasing proximity reader.

The above and other objects are accomplished according to the present invention by providing a radio frequency proximity reader with a base plate housing portion that has an essentially rectangular shape with first and second opposed major surfaces and a centrally located bore extending through the base plate between the first and second major surfaces. A cylindrical housing portion having a concentrically placed bore therethrough is attached to the base plate and extends substantially perpendicular to the first major surface, with the bores of the housing portions being substantially aligned.

A radio frequency antenna including a cylindrical ferrite core having at least one concentrically wound coil is concentrically located within the cylindrical housing portion. At least one signaling means located within the cylindrical housing portion adjacent to the second major surface of the base plate is provided. A cable electrically connects at least one coil and the signaling means and extends out of the cylindrical housing portion. The cable connects the antenna and signaling means to remotely located signal processing circuits.

Means for attaching the base plate to a wall are provided, whereby the first surface abuts against the wall. A rectangular cover attached to the base plate covers the second major surface of the base plate.

The invention will be described in greater detail in connection with embodiments thereof that are illustrated in the drawing figures.

BRIEF DESCRIPTION OF THE DRAWINGS

FIG. 3 is a fragmentary perspective illustration of the cylindrical housing portion shown in FIG. 2.

FIG. 4 is a front elevational view of the base plate for the housing according to present invention.

FIG. 5 is a side elevational view of the base plate shown in FIG. 4.

FIG. 8 is a perspective illustration of a preferred embodiment for attaching the housing of the present invention to a wall.

FIG. 9 is a perspective illustration of the present invention attached to a wall section.

DETAILED DESCRIPTION OF THE INVENTION

Figure 1:
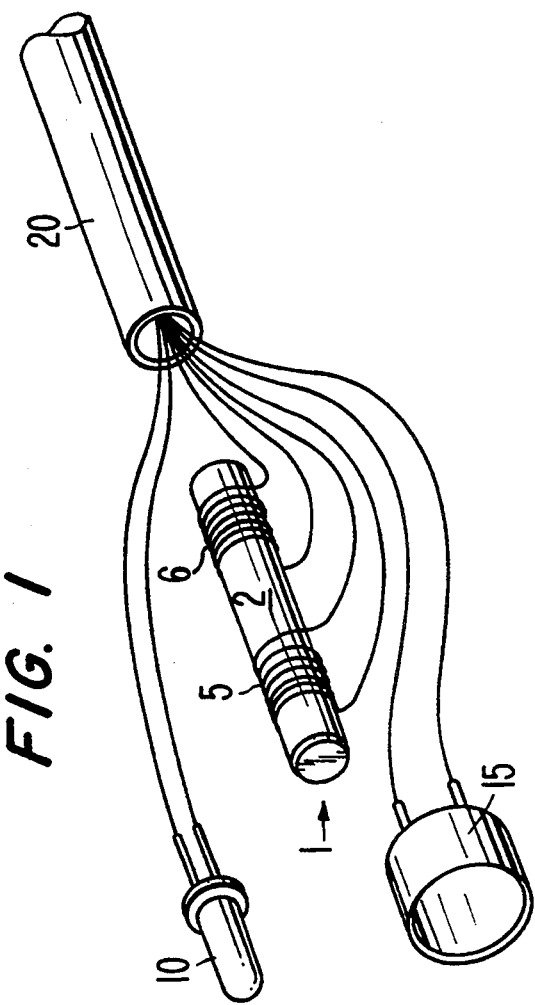
FIG. 1 is a fragmentary perspective illustration of the cylindrical ferrite core antenna, light emitting diode and the piezo beeper of the present invention.

Referring to FIG. 1, a ferrite wound antenna 1 having a cylindrical ferrite core 2. Core 2 has windings 5 and 6 circumferentially wound thereon and electrically connected to a cable 20. A light emitting diode 10 and a piezo beeper 15 are shown electrically connected to cable 20. Cable 20 is attached to remotely located electronics of the reader as well as a power source and a host computer (not shown). Such reader arrangements are old and well known in the art, e.g. see commonly assigned U.S. Pat. No. 5,099,227. In operation, one of the coils 5, 6 on core 2 is energized to produce a field of a first frequency which in turn energizes an associated proximity access card (not illustrated). The proximity access card contains a microchip precoded with data. The energy received by the card conveys the data to be read at a second frequency where it is received by the other coil 5, 6 and sent via cable 20 to the remaining electronics of the reader and host computer for verification. If the code is verified, light emitting diode 10 and piezo beeper 15 are activated, signalling the verification. Light emitting diode 10 may be a single color, or it may be multi-colored, with each different color indicating a different status. It is to be understood that although two coils 5 and 6 are shown on the ferrite core 2, only one coil with a tap may be utilized for both the transmitting and reception of the signals.

Figure 2:
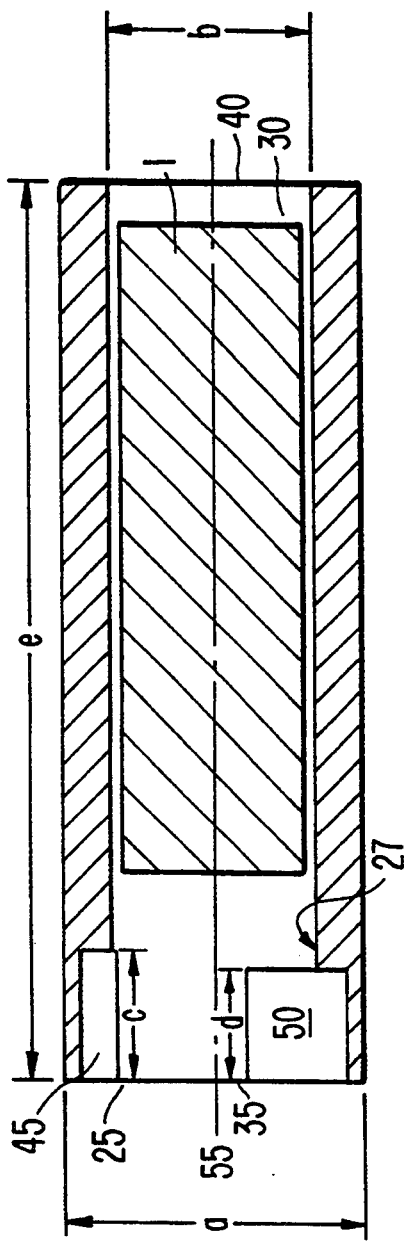
FIG. 2 is a side sectional view of the cylindrical portion of the housing according to the present invention.

FIG. 2 is a side cross sectional view of the cylindrical housing portion 25. Ferrite wound antenna 1, light emitting diode 10 and piezo beeper 15 are accommodated within cylindrical housing portion 25. Cylindrical housing portion 25 typically has a length e of about 3.25 inches, and an outside diameter a of about 0.81 inches. Cylindrical housing portion 25 is provided with a concentrically placed through bore 30. Through bore 30 defines an inside diameter b within cylindrical housing portion 25 of about 0.56 inches. Thus, cylindrical housing portion 25 has an inside wall 27. Through bore 30 accommodates ferrite wound antenna 1 such that ferrite wound antenna 1 and through bore 30 are concentrically arranged.

Cylindrical housing portion 25 has first and second ends 35, 40, respectively. Cylindrical housing portion 25 is provided at first end 35 with a first indent 45 for accommodating light emitting diode 10 (not illustrated). First indent 45 is inset into inside wall 27 a distance c, typically 0.38 inches, such that light emitting diode 10, when inserted within indent 45, is recessed within cylindrical housing portion 25. Cylindrical housing portion 25 is further provided at first end 35 with a second indent 50 for accommodating the piezo beeper 15 (not illustrated). Second indent 50 is inset into inside wall 27 a distance d, typically 0.31 inches, such that piezo beeper 15, when inserted within second indent 50, is recessed within cylindrical housing portion 25. The first and second indents 45, 50, are generally oppositely disposed around a cylindrical housing portion longitudinal axis 55.

FIG. 3, further illustrates the placement of first and second indents 45, 50 within inside wall 27. As is shown, the first and second indents 45, 50 have generally a partial cylindrical shape, which corresponds to the general size and shape of light emitting diode 10 and piezo beeper 15, respectively (not illustrated). Typically, first indent 45 has a radius f of about 0.11 inches, and second indent 50 has a radius g of about 0.28 inches.

FIGS. 4 and 5 show a rectangular shaped base plate 60 for the housing. Base plate 60 typically has a length h of about 2.25 inches, and a width i of about 0.94 inches. Centrally located within a face 65 of base plate 60 is through bore 70 having a diameter j, typically of about 0.81 inches. Diameter j of base plate through bore 70 corresponds in size to outside diameter a of cylindrical housing portion 25.

Base plate 60 is preferably provided with attachment means for attaching the base plate to a surface, for example, a wall. This may include one or more screw holes 75 for accommodating screws or other fastening means.

Figure 6:
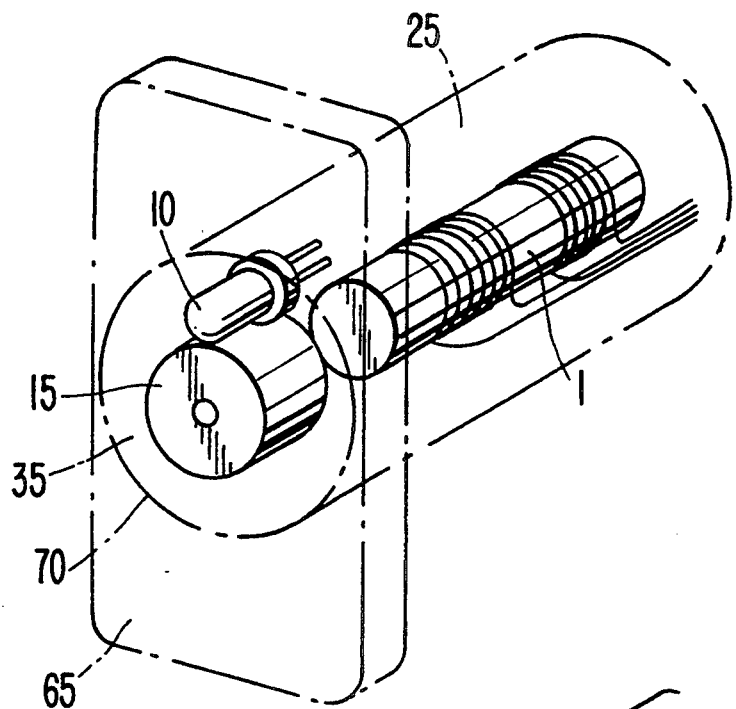
FIG. 6 is a sectional perspective view of the cylindrical ferrite core antenna, light emitting diode and the piezo beeper within the housing of the present invention.

FIG. 6 illustrates the general arrangement of light emitting diode 10, piezo beeper 15 and ferrite wound antenna 1 within the housing according to the invention. As is shown, light emitting diode 10 and piezo beeper 15 are arranged side by side within cylindrical housing portion 25 at first end 35. Located behind light emitting diode 10 and piezo beeper 15 in a direction towards cylindrical housing portion second end 40 is ferrite wound antenna 1.

As shown, cylindrical housing portion 25 is inserted into base plate through bore 70 so that it extends preferably perpendicularly to the surface 65. Because base plate through bore 70 has essentially the same diameter as the outer diameter of cylindrical housing portion 25, a press fit results between the two components. Thus, cylindrical housing portion 25 is securely attached to base plate 60 without the need for additional fastening means. Once press fitted into position, first end 35 is essentially flush with base plate face 65. Although this is the preferred manner of forming the housing 25, 60, it is to be understood that this is not required and that the two components may be fastened together or formed in one piece if desired.

Preferably, base plate 60 and cylindrical housing portion 25 are molded of plastic such as black ABS or polycarbonate.

Figure 7:
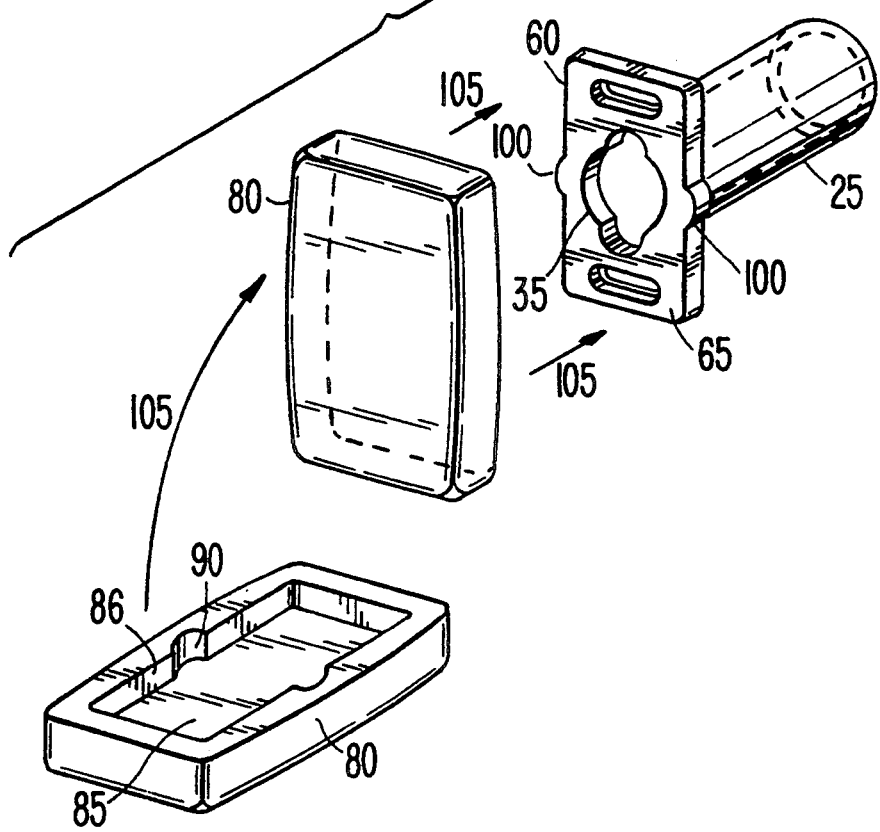
FIG. 7 is a perspective illustration of the cover plate and housing of the present invention.

FIG. 7 shows the cylindrical housing portion 25 with attached base plate 60. In order to complete the housing and provide an attractive appearance, a cover 80 is provided that attaches over base plate face 65, thus covering base plate 60, first end 35, and light emitting diode 10, piezo beeper 15 and ferrite wound antenna 1 enclosed within cylindrical housing portion 25 (enclosed components not illustrated). Preferably, cover 80 is provided with a recess 85 which is dimensioned slightly larger than base plate 60, so that when cover 80 is in position, base plate 60 is inserted within recess 85. Cover 80 is also provided with an arrangement for removably attaching the cover to the base plate 60. For this purpose, the interior side wall 86 defining recess 85 preferably is provided with a pair of oppositely disposed notches or grooves 90 (only one of which is shown), and base plate 60 is likewise provided with corresponding knobs or protrusions 100. Consequently, when cover 80 is moved in a direction of arrows 105, cover 80 is brought into engagement with base plate 60, and protrusions 100 lockingly engage with corresponding notches 90.

Cover 80 allows for the passage of light from light emitting diode 10, and is preferably either translucent white whereby a glow from the light emitting diode is seen through cover 80, or smoke colored, whereby light emitting diode 10 can be seen. Cover 80 is molded of either smoked acrylic or polycarbonate plastic.

FIG. 8 illustrates the installation of the housing, including cylindrical housing portion 25 and attached base plate 60, to a wall 125, e.g. a hollow wall of wall board or the like. As mentioned earlier base plate 60 is preferably provided with attachment means that may include one or more screw holes 75 for accommodating screws 110 or other fasteners. Wall 125 is prepared by drilling two holes 130 that correspond in location with screw holes 75 and a third hole 135 for accommodating cylindrical housing portion 25. If necessary, wall anchors 120 are inserted into wall holes 130. Base plate 60 with attached cylindrical housing portion 25 are moved into position against wall 125, with cylindrical housing portion 25 being inserted into wall hole 135. Screw holes 75 are aligned with respective wall screw holes 130 or wall anchors 120. Screws 110 are inserted into screw holes 75, and threaded into the respective wall screw hole 130 or wall anchor 120, thus securing base plate 60 to wall 125.

Referring to FIG. 9, an access control reader antenna 140 is illustrated attached to wall 125 with cover 80 in position over base plate 60. Cable 20 is attached to the remaining reader circuitry and a remote host computer (not shown) for processing of signals. The foregoing is a complete description of a preferred embodiment of the invention. Various changes may be made without departing from the spirit and scope of the present invention. The invention, therefore, should be limited only as set forth in the claims.

What is claimed is:

1. A radio frequency proximity reader, comprising:
   a base plate housing portion having an essentially rectangular shape with first and second opposed major surfaces and having a centrally located bore extending through said base plate between said first and second major surfaces;
   a cylindrical housing portion having a concentrically placed bore therethrough, said cylindrical housing portion being attached to said base plate and extending substantially perpendicular to said first major surface with the bores of said housing portions being substantially aligned;
   a radio frequency antenna including a cylindrical ferrite core having at least one concentrically wound coil, concentrically located within said cylindrical housing portion;
   at least one signaling means located within said cylindrical housing portion adjacent said second major surface of said base plate;
   a cable electrically connected to said at least one coil and said signaling means and extending out of said cylindrical housing portion for connecting the antenna and signaling means to remotely located signal processing circuits;
   means for attaching said base plate to a wall, whereby said first major surface abuts against the wall; and
   a rectangular cover attached to said base plate and covering said second major surface of said base plate.

2. A radio frequency proximity reader as defined in claim 1, wherein said at least one signaling means comprising a light emitting diode.

3. A radio frequency proximity reader as defined in claim 2, wherein said cover allows for the emittance of light from said light emitting diode.

4. A radio frequency proximity reader as defined in claim 1, said at least one signaling means comprising a piezo beeper.

5. A radio frequency proximity reader as defined in claim 1, wherein said antenna includes a pair of coils for transmitting and receiving coded data signals.

6. A radio frequency proximity reader as defined in claim 1, said cylindrical housing portion having a first end press fitted into said base plate bore.

* * * * *